Patented Nov. 21, 1922.

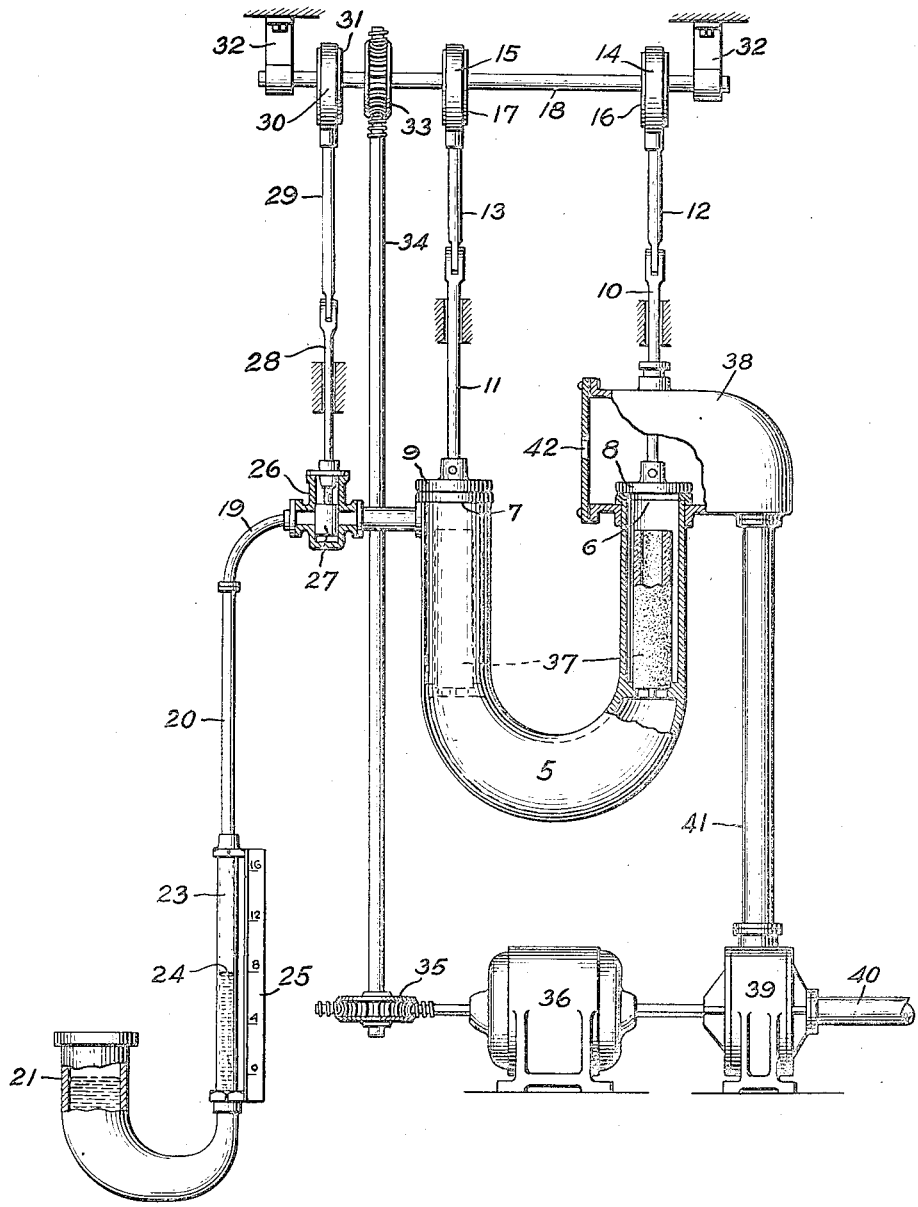

1,436,273

UNITED STATES PATENT OFFICE.

JACOB W. McNAIRY, OF SCHENECTADY, NEW YORK, ASSIGNOR TO GENERAL ELECTRIC COMPANY, A CORPORATION OF NEW YORK.

INSTRUMENT FOR MEASURING CARBON DIOXIDE IN GAS MIXTURES.

Application filed January 28, 1921. Serial No. 440,800.

*To all whom it may concern:*

Be it known that I, JACOB W. MCNAIRY, a citizen of the United States, residing at Schenectady, in the county of Schenectady, State of New York, have invented certain new and useful Improvements in Instruments for Measuring Carbon Dioxide in Gas Mixtures, of which the following is a specification.

The present invention relates to instruments for measuring the amount of carbon dioxide gas in gas mixtures. The principal application of such instruments is in connection with boilers for measuring the $CO_2$ in flue gas, the percentage of $CO_2$ being indicative of the efficiency of combustion, and the following description of the invention is specifically described as applied to this use. It will be understood, however, that the invention is not necessarily limited to this use.

The invention relates particularly to carbon dioxide measuring instruments of the type in which a sample of the gas mixture is trapped in a chamber containing a suitable reagent which absorbs $CO_2$, the vacuum created in the chamber by the absorption of the $CO_2$ being measured to indicate the percentage of $CO_2$.

The object of my invention is to provide an improved structure and arrangement in an instrument of this character, and for a consideration of what I believe to be novel and my invention, attention is directed to the accompanying description and the claims appended thereto.

In the drawing, the figure is a diagrammatic view of an apparatus embodying my invention.

Referring to the drawing, 5 indicates an absorption chamber here shown in the form of a U-tube. At the ends of the U-tube are inlet and discharge openings 6 and 7 respectively which are normally closed by valves 8 and 9. The stems 10 and 11 of valves 8 and 9 are connected by links 12 and 13 to collars 14 and 15 which surround cams 16 and 17 on cam shaft 18. Connected with the absorption chamber 5 adjacent its discharge end is a tube 19 which connects with one leg 20 of a U-tube manometer. The other leg 21 of the U-tube manometer is subjected to atmospheric pressure. Leg 20 of the manometer comprises a glass section 23 through which the meniscus 24 of the indicating liquid may be seen, and associated with this section is a scale plate 25 having a suitable scale marked thereon. In tube 19 is a valve casing 26 containing a valve 27. The stem 28 of valve 27 is connected by a link 29 to a collar 30 which surrounds a cam 31 on cam shaft 18. Cam shaft 18 is mounted in suitable bearing brackets 32 and is rotated by a gearing 33 at the upper end of a shaft 34. The lower end of shaft 34 is driven through a gearing 35 by a suitable motor 36. Motor 36 drives shaft 18 at a suitable speed for correct operation of the apparatus. In absorption chamber 5 a suitable absorption reagent is placed, the same being shown in the present instance as comprising hollow sticks of KOH as indicated at 37.

Cams 16 and 17 are so arranged that they simultaneously positively open and close valves 8 and 9 and when in use valves 8 and 9 are opened by the cams for a definite period during which a sample of the gas to be analyzed is introduced into absorption chamber 5. Valves 8 and 9 then close for a certain period during which absorption takes place. At the end of this period cam 31 opens valve 27 so that the manometer may measure the pressure in absorption chamber 5. Valve 27 then again closes after which valves 8 and 9 simultaneously open, the old charge of gas being then forced out and a new one taking its place. The cycle of operation is then repeated.

In instruments of this character as heretofore constructed, it has been customary to suck the sample of gas through the absorption chamber by means of a suitable pump, such as an ejector. In such arrangements the pump has its suction side suitably connected to the discharge opening of the absorption chamber, the inlet opening of the absorption chamber being connected by a pipe to the stack or other region from which the sample is to be taken. The pump may be in continuous operation or in operation only during the period the inlet and discharge valves are open to admit a new sample to the absorption chamber.

In actual practice this arrangement has been found to be objectionable in that it creates a vacuum in the absorption chamber during the introduction of a new sample so that when the inlet and discharge valves close to trap a new sample in the absorption chamber, the pressure therein will be below atmospheric, and will vary according to the amount of suction applied. The suction pressure applied varies from time to time due to changes in operating conditions which means that the pressure in the absorption chamber at the instant the valves close varies from time to time. Due to this variation in initial pressure the instrument will give inaccurate results. In order to ensure a fresh sample from the stack or other point from which the sample is taken, it is desirable that the pipe leading from the stack to the absorption chamber be as small as possible. This means that with a small pipe a considerable suction is required to draw the fresh sample in during the limited time the valves are open. Because of this high suction the vacuum in the absorption chamber will of course be subject to greater variations.

Also with an arrangement of this character, while the suction device is running the pressure in the piping between the stack and the suction device and in the absorption chamber is below atmospheric pressure and as a result any leakage is in the form of leakage of air into the apparatus which, of course, pollutes the sample being taken thereby introducing inaccuracies. Because of this it has heretofore been necessary to carefully pack the valve stems and have an absolutely air-tight structure, a thing difficult to obtain in ordinary commercial practice.

More particularly, the object of my invention is to overcome the above difficulties and to this end I provide a pump or blower which, instead of sucking the sample of gas through the absorption chamber, forces it through with a positive pressure. By this arrangement I am enabled to obtain a sample much more quickly which sample is more uniform and is always supplied to the absorption chamber at exactly the same pressure.

In carrying out my invention I provide a valve casing or housing 38 which encloses inlet valve 8. I then provide a suitable pump 39 here shown in the form of a centrifugal fan or blower which has its suction side connected by a pipe 40 to the region from which the sample of gas to be analyzed is to be taken and its discharge side connected by a pipe 41 to casing or housing 38. Pump 39 may be driven conveniently from the same motor 36 which drives cam shaft 18. In casing 38 is a small opening 42 which permits pump 39 to continuously pump a certain amount of gas through the casing. Pump 39 is running continuously and builds up a slight pressure on the casing 38. With this arrangement when valves 8 and 9 open a fresh sample of the gas to be analyzed is quickly forced into the absorption chamber, the gas already there being swept out. This thoroughly scavenges the absorption chamber of the old sample and introduces a complete new one. The sample thus introduced into the absorption chamber and trapped therein when valves 8 and 9 close will be substantially at atmospheric pressure so there will be no tendency for leakage either in or out around discharge valve 9. The pressure around valve 8 will be but slightly higher than that of the absorption chamber and with ordinary care no difficulty will be experienced by leakage around valve 8.

Since blower 39 is continuously passing a certain amount of gas to be analyzed through pipe 41 and out through opening 42, it will be seen that when valves 8 and 9 open the sample taken in will be a fresh one directly from the region from which the gas sample is taken, for example, the stack of a boiler. This is an important consideration as in the use of apparatus of this character it is desirable to analyze a sample which represents the conditions existing at the instant the analysis is made.

Thus it will be seen that by my invention I am enabled to obtain quicker and more uniform samples of the gas to be analyzed and that always such sample will be trapped in the absorption chamber at the same initial pressure, substantially atmospheric pressure.

Also since the gas is supplied by the pump at a pressure greater than atmospheric it is unnecessary that the piping should be tight because of the fact that any leakage is of gas to atmosphere. This of course is unobjectionable. Furthermore, I need provide no casing or housing for the discharge valve and that around the inlet valve need not be made with special care as to tightness. The valve stem where it passes through the casing or housing need not be packed and the housing can be made with a loose cover so as to permit of ready access to the valve. This means that the structure is greatly simplified and that the valves are always readily accessible.

In the present instance I have shown the various valves as being mechanically operated. It will be understood, however, that they may be operated in any other suitable manner. Also I may use any suitable reagent in the absorption chamber.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a gas-analyzing apparatus, an absorption chamber adapted to hold an absorption reagent, an inlet opening and an exhaust opening in said chamber, valve means controlling said openings, a casing around the inlet valve means, and a pump for supplying the gas to be analyzed under pressure to said casing.

2. In a gas-analyzing apparatus, an absorption chamber adapted to hold an absorption reagent, an inlet opening and an exhaust opening in said chamber, valve means controlling said openings, a casing around the inlet valve means, and a pump for supplying the gas to be analyzed under pressure to said casing, said casing having an opening in its wall to permit of a continuous discharge of gas.

3. In a gas-analyzing apparatus, a U-tube absorption chamber adapted to hold an absorption reagent, said chamber being provided with admission and discharge openings, valve means controlling said openings, a pressure indicating device, means connecting it to said chamber, a valve in said last named means, and a pump having its suction side connected to the region from which the gas to be analyzed is taken and its discharge side connected to the admission opening.

In witness whereof, I have hereunto set my hand this 26th day of January 1921.

JACOB W. McNAIRY.